(12) United States Patent
Yoshida et al.

(10) Patent No.: US 6,408,575 B1
(45) Date of Patent: Jun. 25, 2002

(54) HORIZONTAL AXIS TYPE WIND TURBINE AND METHOD OF CONSTRUCTION THEREOF

(75) Inventors: Shigeo Yoshida; Yuji Kawakita; Yasuhiro Koshioka; Toru Nagao; Noriyuki Takahashi, all of Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/537,512

(22) Filed: Mar. 29, 2000

(30) Foreign Application Priority Data

Mar. 30, 1999 (JP) ............................................ 11-087705

(51) Int. Cl.⁷ .............................................. E04H 12/34
(52) U.S. Cl. ........................ 52/40; 52/123.1; 52/745.17
(58) Field of Search .................... 52/40, 123.1, 745.17, 52/745.18, 741.14, 741.15, 745.04; 290/55

(56) References Cited

U.S. PATENT DOCUMENTS

| | | | | |
|---|---|---|---|---|
| 3,827,197 A | * | 8/1974 | Adam | ............................. 52/40 |
| 4,272,929 A | * | 6/1981 | Hanson | ........................... 52/40 |
| 4,590,718 A | * | 5/1986 | Angeloff | ................... 52/745.18 |
| 5,254,876 A | * | 10/1993 | Hickey | ......................... 290/55 |

FOREIGN PATENT DOCUMENTS

| | | | |
|---|---|---|---|
| JP | 58-192977 | * 10/1983 | ..................... 52/40 |

* cited by examiner

*Primary Examiner*—Michael Safavi
(74) *Attorney, Agent, or Firm*—Smith, Gambrell & Russell, LLP

(57) ABSTRACT

A tower comprises a base tower member fixed on a base in the ground, a lower tower member hingedly connected at a lower end thereof with an upper end of the base tower member through a hinge and swinging between a lying position and a standing position, a first stage connecting tower member connected at a lower end thereof with an upper end of the lower tower member, a second stage connecting tower member connected at a lower end thereof with an upper end of the first stage connecting tower member, and a third stage connecting tower member connected at a lower end thereof with an upper end of the second stage connecting tower member. Thus formed tower is raised swingingly around the hinge from the lying position to the standing position. A nacelle includes a tower penetrating hole through which the tower vertically penetrates and is formed by a plurality of nacelle sections divisible around the tower penetrating hole. After the tower is built, a plurality of nacelle sections are collected around the tower and are connected with each other while the nacelle is penetrated by the tower. Then, the nacelle is lifted up along the tower in that state and fixed to the top end of the tower.

9 Claims, 10 Drawing Sheets

HORIZONTAL AXIS TYPE WIND TURBINE AND METHOD OF CONSTRUCTION THEREOF

BACKGROUND OF THE INVENTION

1. Field of the Invention

The present invention relates to a wind turbine, and more particularly, to a horizontal axis type wind turbine and a method of construction thereof.

2. Background Art

In general, the horizontal axis type wind turbine utilized for wind power generation, is installed on the top end of a tall tower so as to be able to acquire energy of natural wind efficiently.

Figure 10:
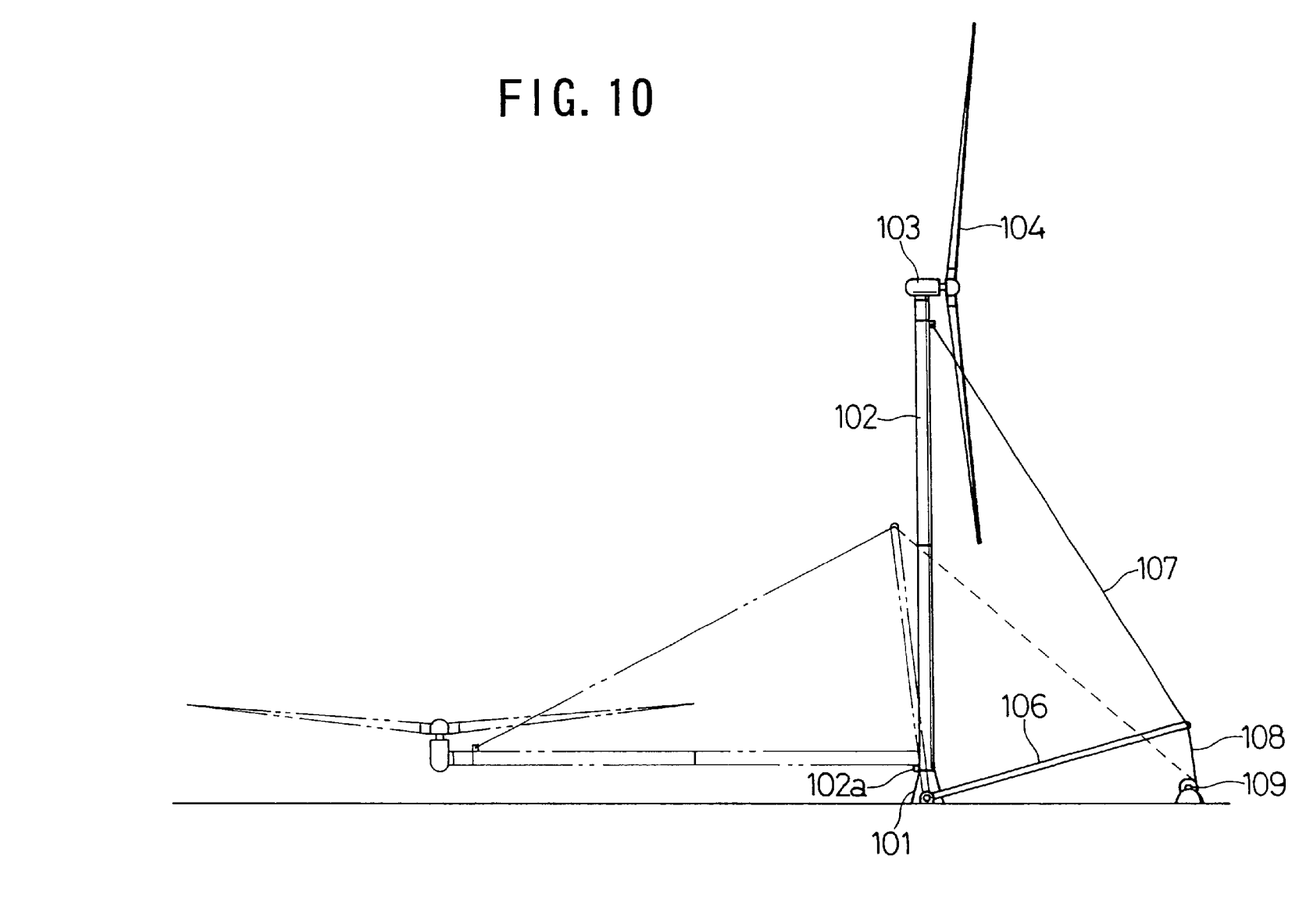
FIG. 10 is a schematic view showing a wind turbine of a prior art.

For example, a wind turbine of this kind is disclosed in Japanese Patent Application Laid-open No. Toku-Kai-Sho 58-192977. As shown in FIG. 10, the wind turbine comprises a base member 101, a tower 102 mounted on the base member 101 and vertically extending, a nacelle 103 supported at the top of the tower 102 and a rotor 104 installed in the nacelle 103.

The tower 102 is hingedly connected with the base member 101 through a hinge 102a so as to swing between a standing position as illustrated in solid lines and a falling position as illustrated in two-dot chain lines. Further, a ginpole 106 is hingedly supported at the lower end thereof with the base member 101 and a tensile wire 107 is connected between the top end of the ginpole 106 and the upper portion of the tower 102. Further, the top end of the ginpole 106 is connected with a winch 109 through a towing wire 108.

Accordingly, when the winch 109 winds up the towing wire 108, the tower 102 can be raised from the falling position to the standing position through the ginpole 106 and the tensile wire 107. On the other hand, when the winch 109 winds down the towing wire 108, the tower 102 can be laid down from the standing position to the falling position.

This ginpole 106 and the tensile wire 107 are detachable so that they are installed when the maintenance is done and are removed when the maintenance is finished. When the wind turbine is operated with the ginpole 106 and tensile wire 107 removed, the lower end of the tower 102 is fixed to the base member 101 by bolts and the like so as to maintain the tower 102 in a standing position.

As another method of construction of the wind turbine, there is a method of using a mobile crane for raising the tower, mounting it on the base member, and attaching the nacelle and the rotor to the upper end of the tower.

According to the wind turbine disclosed in Toku-Kai-Sho 58-192977, since the tower 102 is hingedly connected at the lower end thereof with the base member 101 so as to swing between the standing and falling positions, maintenance and repair work to a generator or other equipment accommodated in the nacelle 103 can be done on the ground efficiently.

However, a large towing force is required in order to raise the tower 102 having a heavy nacelle at the top end thereof from the falling position to the standing position, therefore this swing type of the wind turbine is suitable for a wind turbine of small size.

On the other hand, according to the latter method of using a mobile crane, since the nacelle or the rotor are installed after the tower is built, it is possible to construct a relatively large size of the wind turbine by employing a large size mobile crane.

However, using the large size mobile crane and the like incurs an increase of procurement cost of construction equipment. Particularly, in case of construction works in islands, mountains, remote places and the like, the construction equipment procurement cost would increase. Furthermore, there would be a difficulty in securing a work space suitable for construction. Further, the maintenance cost would increase because of the necessity for a large size crane.

As a result, there are many cases where the construction of wind turbines must avoidably given up in spite of the fact that the power supply by wind turbines is most desired in these islands, mountains, remote places and the like and the case is similar with underdevelopment countries where the procurement of construction equipments like large size of cranes is generally difficult.

SUMMARY OF THE INVENTION

It is an object of the present invention to provide a method of constructing a relatively large size, horizontal axis type wind turbine capable of reducing construction cost without using a crane of large size.

In order to attain the object, the horizontal axis type wind turbine having a tower mounted on a base, a nacelle mounted on the tower and a rotor supported by the nacelle, the tower comprises a base tower member mounted on the base, a lower tower member hingedly connected at a lower end thereof with an upper end of the base tower member through a hinge so as to swing from a lying position to a standing position, a first stage connecting tower member connected at a lower end thereof with an upper end of the lower tower member and a highest stage connecting tower member connected at a lower end thereof with an upper end of a second highest stage connecting member. Further, the nacelle includes a tower penetrating hole through which the tower vertically penetrates and is formed by a plurality of nacelle sections divisible around the tower penetrating hole.

DESCRIPTION OF PREFERRED EMBODIMENTS

Figure 1:
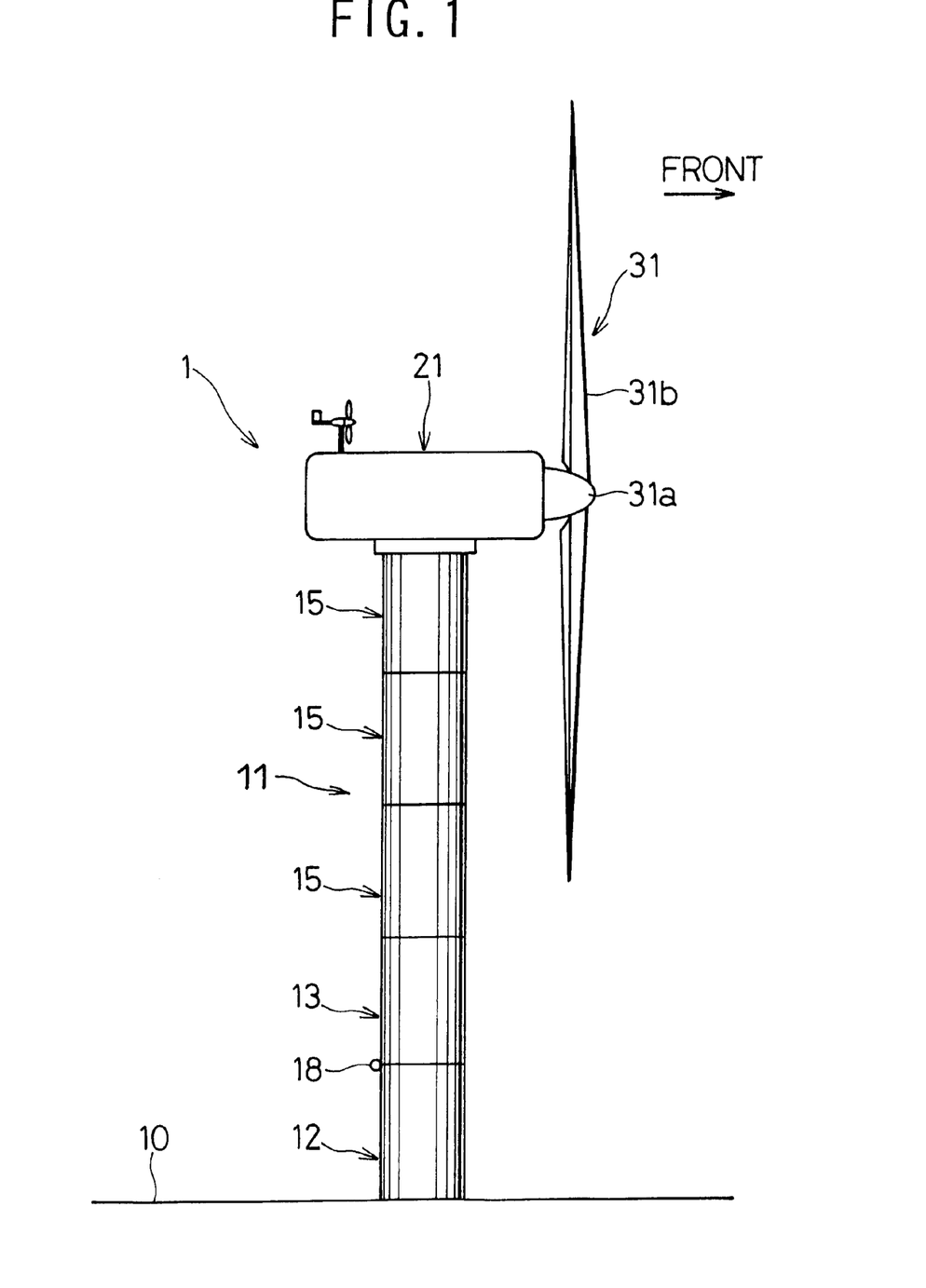
FIG. 1 is a side view of a horizontal axis type wind turbine according to an embodiment of the present invention.

Referring now to FIG. 1, reference numeral 1 denotes a horizontal axis type wind turbine which comprises a base 10, a tower 11 standing on the base 10, a nacelle 21 mounted on the top end of the tower 11, a hub 31a supported by the nacelle 21, a rotor 31 including one or two blades 31b.

The tower 11 includes a base tower member 12 secured to the base 10, a lower tower member 13 and a plurality of connecting tower members 15.

Figure 2:
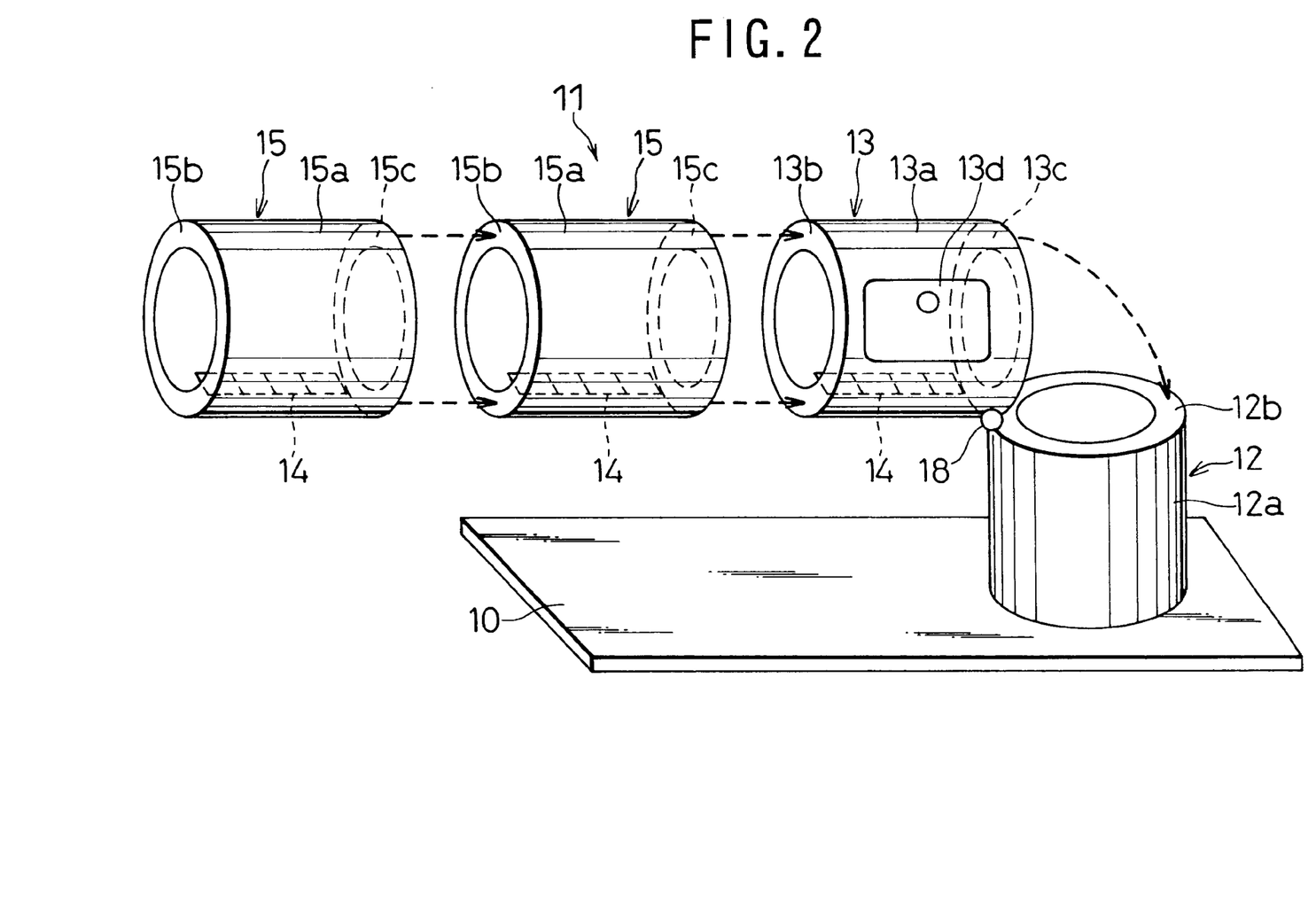
FIG. 2 is a partially exploded perspective view of a tower according to an embodiment of the present invention.

The base tower member 12 is fabricated of metal and has a cylindrical or polygonal body 12a in which a man can work. An annular upper flange 12b is provided along the upper edge of the cylindrical body 12a with a peripheral edge folded inside. Further, there is provided a wire hole 12c which will be described hereinafter in the cylindrical body 12a.

Further, the lower tower member 13 is fabricated of metal and has a cylindrical body 13a with the same diameter as the cylindrical body 12a of the base tower member 12. The cylindrical body 13a has an annular upper flange 13b and lower flange 13c along the upper and lower edges thereof, respectively with peripheral edges folded inside. Further, the cylindrical body 13a has a door 13d for opening and closing a hatch (not shown) and a ladder 14 is provided longitudinally along the inner surface thereof.

The connecting tower member 15 is fabricated of metal and has a cylindrical body 15a with the same diameter as the cylindrical body 13a of the lower tower member 13. The cylindrical body 15a has an annular upper flange 15b and lower flange 15c along the upper and lower edges thereof, respectively with peripheral edges folded inside. A ladder 14 is provided longitudinally along the inner surface of the cylindrical body 15a.

These base tower member 12, lower tower member 13 and connecting member 15 are appropriately established respectively to have a length not hindering transportation. Further, the upper flange 12b of the base tower member 12, the upper flange 13b and the lower flange 13c of the lower tower member 13 and the upper flange 15b and the lower flange 15c of the connecting tower member 15 form connecting means for connecting respective tower members 12, 13 and 15.

The lower tower member 13 is hingedly connected at the lower end thereof with the upper end of the base member 12 through a hinge 18 so as to be swingable between the lying or falling position and the standing position. The lower tower member 13 is connected with a first stage connecting tower member 15 by securing the upper flange 13b of the lower tower member 13 to the lower flange 15c of the first stage connecting tower member 15 by bolts (not shown) and the like.

Similarly, the first stage connecting tower member 15 is connected with a second stage connecting tower member 15 by securing the upper flange 15b of the first stage connecting tower member 15 to the lower flange 15c of the second stage connecting tower member 15 by bolts and the like.

In this embodiment, when three connecting tower members 15 are finished to be connected with the lower tower member 13, the lower tower member 13 are raised around the hinge 18 together with three connecting tower members 15, and then the upper flange 12b of the base tower member 12 is connected with the lower flange 13c of the lower tower member 13 by bolts and the like, thus the tower 11 is completed.

Figure 3:
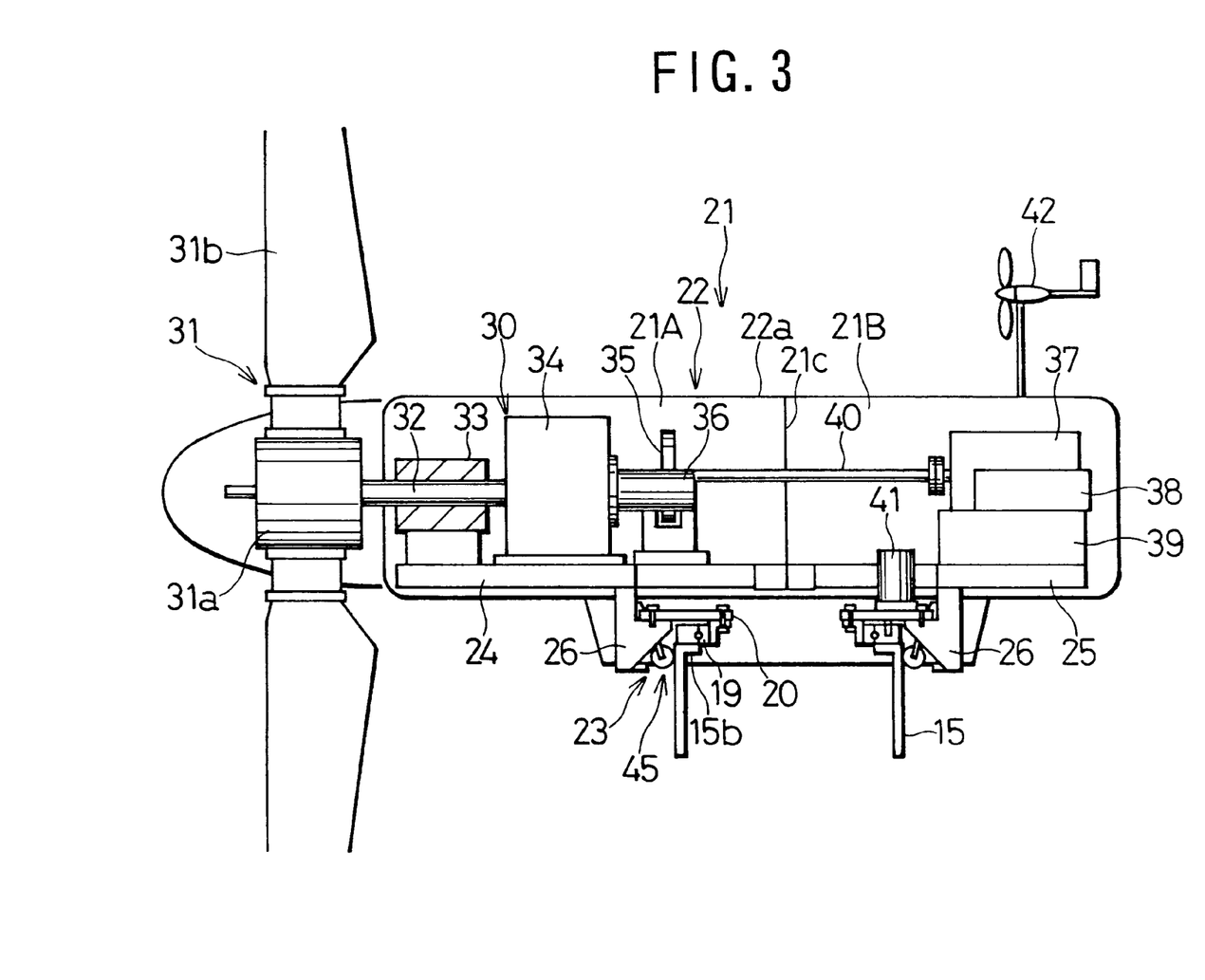
FIG. 3 is a longitudinal sectional view of a nacelle including a rotor according to an embodiment of the present invention.

As shown in FIG. 3, the nacelle 21 is rotatably mounted on the upper flange 15b of the uppermost or highest stage connecting tower member 15 through a bearing 19 having an inner race and outer race provided along the upper flange 15b.

The outer race of the bearing 19 is connected with the upper flange 15b of the uppermost or highest stage connecting tower member 15 and a gear is formed on the outer periphery of the outer race of the bearing 19. Further, the inner race of the bearing 19 is connected with an annular nacelle mounting plate 20 having a larger diameter than the outer diameter of the connecting tower member 15 through bolts and the like.

Figure 4:
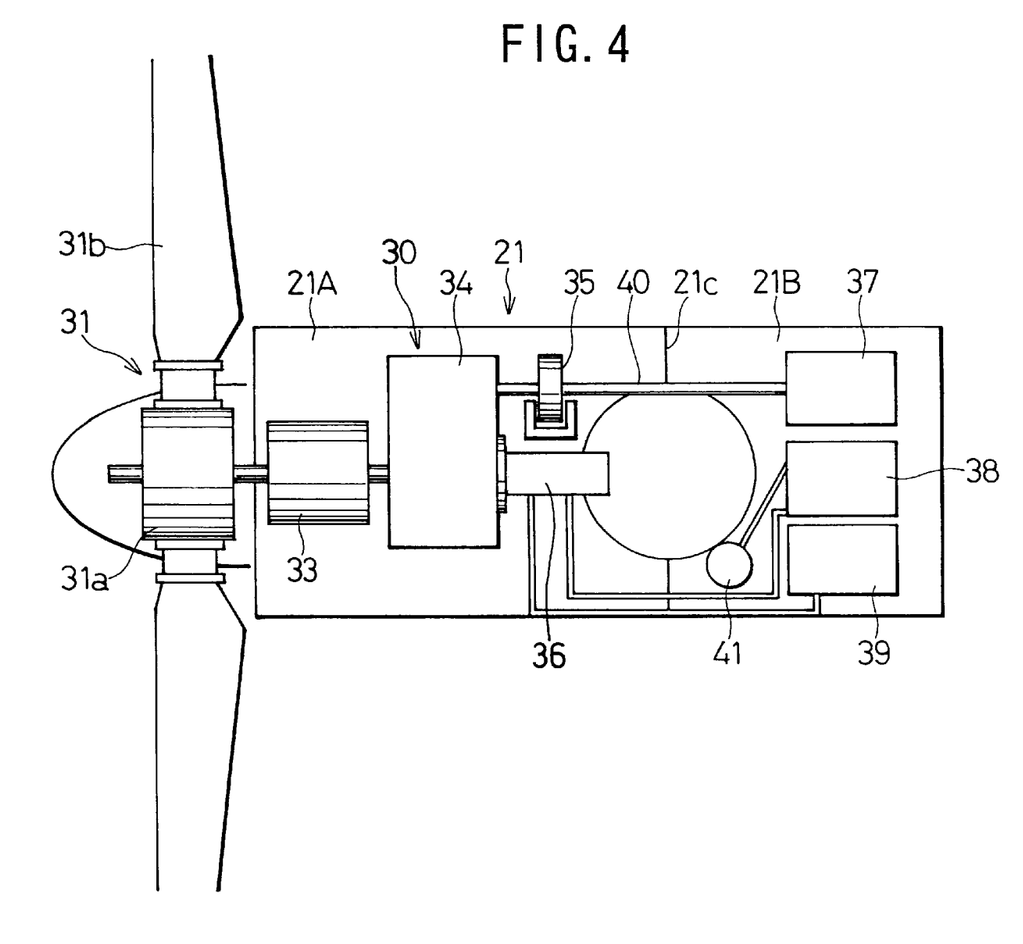
FIG. 4 is a horizontal sectional view of a nacelle including a rotor according to an embodiment of the present invention.

On the other hand, as illustrated in FIGS. 3 and 4, the nacelle 21 has a cylinder-like configuration extending horizontally with both ends closed. The nacelle 21 is formed by a front nacelle section 21A and a rear nacelle 21B. The front and rear nacelle sections 21A, 21B can be separated into an upper portion and lower portion along a longitudinal separation line, respectively. The front nacelle section 21A is connected at a nacelle connecting section 21c with the rear nacelle section 21B.

The nacelle 21 has nacelle penetrating holes 22, 23 capable of being penetrated by the lower tower member 13 and the connecting tower member 15 and disposed opposite to each other on the upper and lower surfaces thereof, respectively. The tower penetrating hole 22 provided on the upper surface of the nacelle 21 is closed by a lid 22a, after the nacelle 21 is mounted on the tower 11.

A front supporting member 24 and rear supporting member 25 are installed on the floor surface of the front nacelle section 21A and rear nacelle section 21b, respectively in such a manner that those supporting members 24, 25 do not hinder the nacelle penetrating hole 23. The respective supporting members 24, 25 are connected through a plurality of L-shaped nacelle mounting members 26 with the nacelle mounting plate 20. In this embodiment, the nacelle mounting members 26 are connected with the nacelle mounting plate 20 by bolts.

The nacelle 21 accommodates nacelle equipments 30 therein. As shown in FIGS. 3 and 4, for example, in an area of the front nacelle section 21A where the passage of the tower 11 through the nacelle 21 is not obstructed, a rotation shaft 32 for supporting a rotor 31, a bearing box 33 for supporting the rotation shaft 32, a gear box 34 for changing the revolution speed of the rotation shaft 32, a brake 35 and the like, are disposed.

Further, in an area of the rear front nacelle section 21B where the passage of the tower 11 through the nacelle 21 is not obstructed, a generator 37, a controller 38, a hydraulic power sources 39 and the like, are disposed. Further, a drive shaft 40 is disposed between the gear box 33 and the generator 37 to transmit power from the gear box 34 to the generator 37. Further, a yaw motor 41 is mounted on the nacelle mounting plate 20 in order to rotate the nacelle 21. An output shaft of the yaw motor 41 is provided with a drive gear (not shown) and the drive gear meshes with the gear formed on the outer periphery of the outer race of the bearing 19 so that the rotation of the yaw motor 41 changes or adjusts the direction of the rotor 31 supported by the nacelle 21.

A wind direction & speed meter 42 is mounted on the rear nacelle section 21B. The wind direction and wind speeds measured by the wind direction & speed meter 42 are sent to the controller 38, from which miscellaneous operation signals are sent to the actuator 36, brake 35, yaw motor 41 and the like to operate the generator 37 most efficiently according to the wind conditions.

Figure 5:
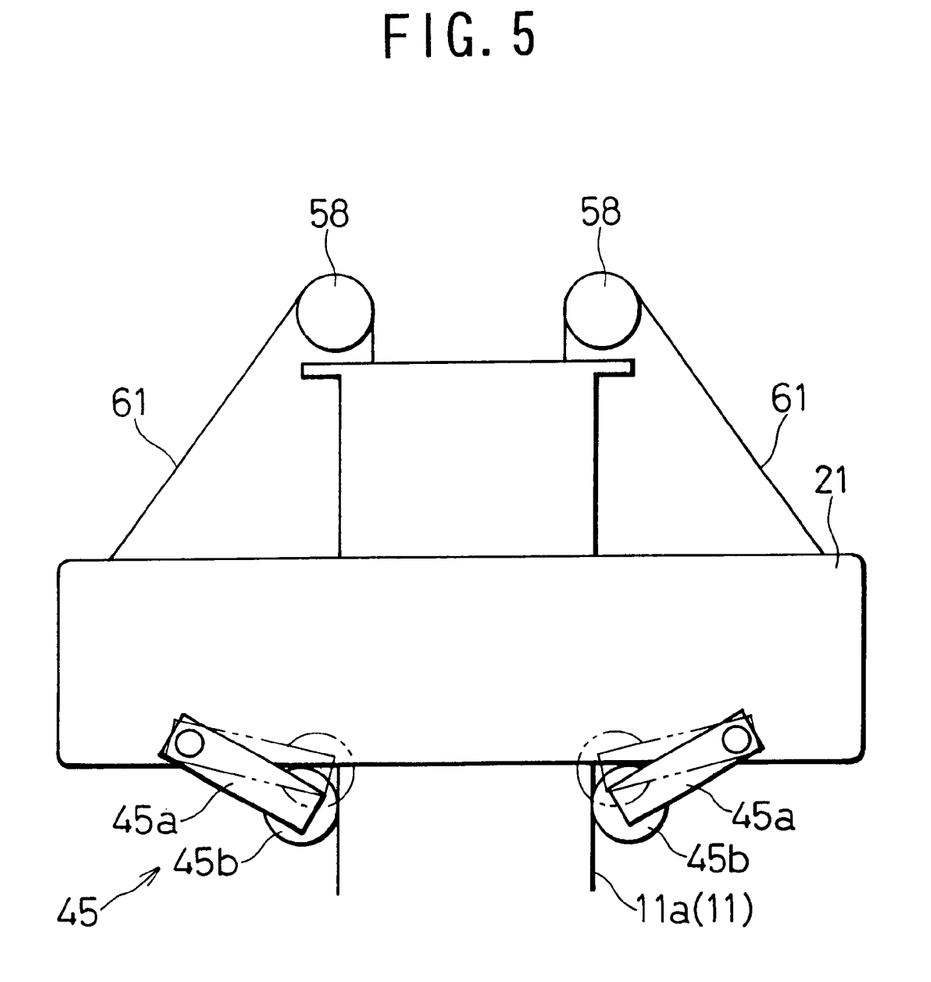
FIG. 5 is a sectional view showing a guide mechanism according to an embodiment of the present invention.

The nacelle 21 has a guide mechanism 45 for assisting the smooth rising of the nacelle 21 at the bottom part thereof. As shown in FIG. 5, the guide mechanism 45 comprises a plurality of arms 45a swingingly connected to the bottom part of the nacelle 21, a guide roller 45b rotatably connected to the tip of the arm 45a, and a spring (not shown) as a biasing means so as to press the guide roller 45b on an outer peripheral surface 11a of the tower 11. The guide roller 45b is provided with a reversing prevention mechanism (not shown) so as to lock the guide roller 45b when the nacelle 21 descends. That is, the guide mechanism 45 has a drop prevention function for preventing the nacelle 21 from dropping. The biasing force of the biasing means is deleted after the nacelle 21 is fixed to the tower 11.

Figure 6:
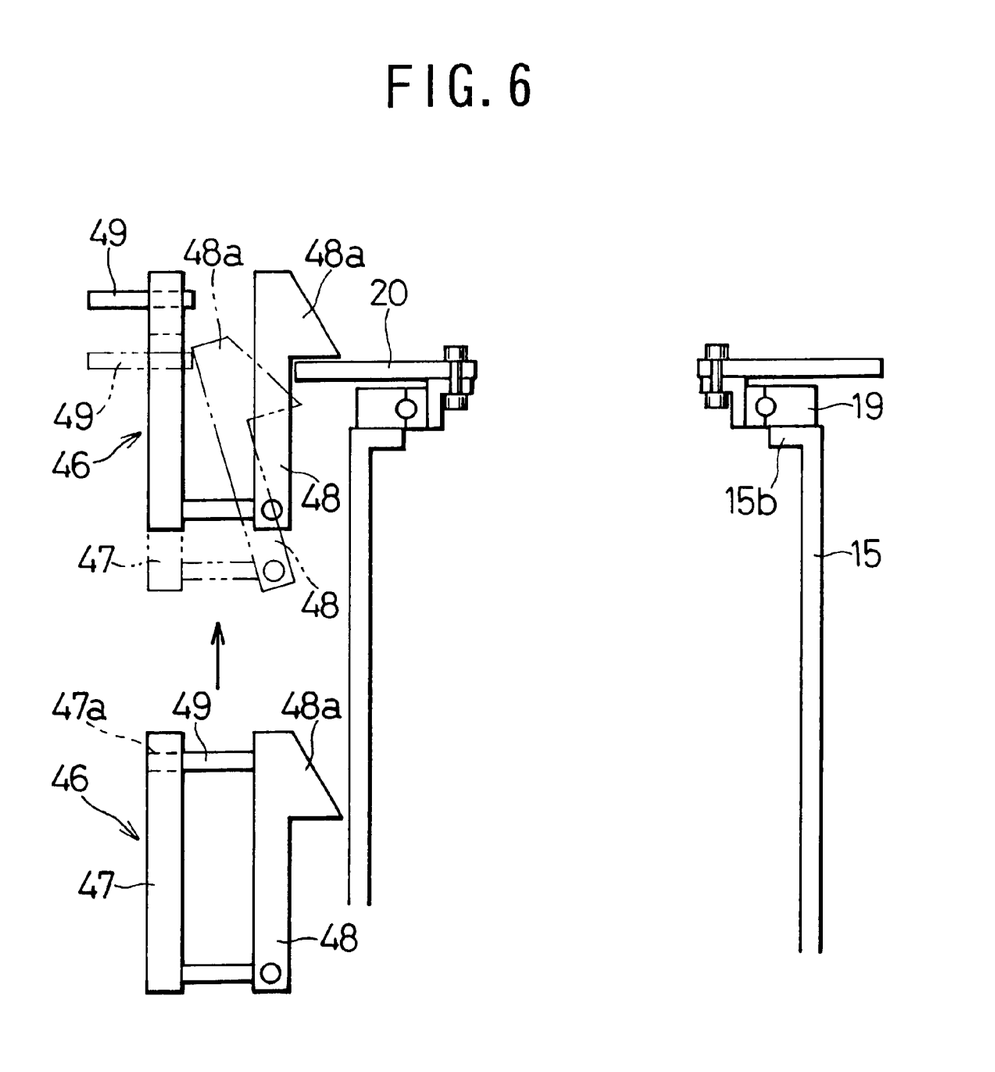
FIG. 6 is a sectional view showing a safety device according to an embodiment of the present invention.

In lifting up the nacelle 21 along the tower 11, when the nacelle 21 reaches the upper end of the tower 11, the nacelle 21 is prevented from falling down by a safety device 46.

The safety device 46, as shown in FIG. 6, comprises a supporting member 47 supported by the nacelle 21, a hook member 48 swingingly connected at the lower end thereof with the supporting member 47 and having a hook 48a at the upper end thereof, an indicator rod 49 slidably fitted to a through hole 47a bored in the supporting member 47 and capable of abutting against the upper end of the hook member 48, and a biasing means (not shown) such as a spring and the like for biasing the hook member 48 in the separating direction from the supporting member 47.

In this constituted safety device 46, the nacelle 21 is lifted up along the tower 11 in such a state that one end of the indicator rod 49 abuts against the hook member 48 and the other end thereof is fitted to the through hole 47a. Then, the hook member 48 is pushed on the supporting member 47 side against the biasing means by the contact of the tapered surface of the hook 48a with the outer edge of the nacelle mounting plate 20, as illustrated by two-dot chain lines. When the nacelle 21 further goes up, as illustrated by solid lines, the hook 48a of the hook member 48 is engaged with the top surface of the nacelle mounting plate 20 to prevent the nacelle 21 from dropping and at the same time the indicator rod 49 remains in the supporting member 47 with the other end thereof projected from the through hole 47a. Accordingly, it can be confirmed by observing the movement of the indicator rod 49 from ground whether or not the nacelle 21 reaches a predetermined position. The indicator rod 49 should be painted in red or yellow so as to be easy to observe.

Next, the method of construction of thus constituted horizontal axis type wind turbine 1 will be described by reference to FIGS. 7a through 7g.

Figures 7A, 7C:
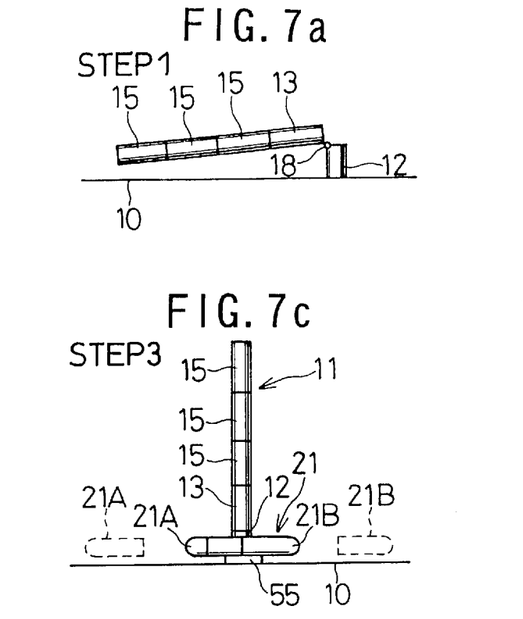
FIGS. 7a through 7g are explanatory views showing an outline of a construction method of a horizontal axis type wind turbine according to an embodiment of the present invention.

First, the base tower member 12, the lower tower member 13, a plurality of connecting tower members 15, the nacelle 21, the rotor 31, the nacelle equipments 30 and the like are carried in to the construction place. At a step 1, as shown in FIG. 7a and FIG. 2, the base tower member 12 is installed on and fixed to the base 10 formed in the construction place. Then, the base tower member 12 is swingingly connected at the one end of the upper edge thereof with the one end of the lower edge of the lower tower member 13 in a lying or falling position through the hinge 18.

Then, the upper flange 13b of the lower tower member 13 is mated with the lower flange 15c of the connecting tower member 15 and the mating surface of both flanges is fastened by bolts and the like. Thus, the lower tower member 13 is connected with the first stage connecting tower member 15.

Further, the upper flange 15b of the first stage connecting member 15 is mated with the lower flange 15c of the second stage connecting tower member 15 and the mating surface of both flanges is fastened by bolts and the like. Thus, the first stage connecting tower member 15 is connected with the second stage connecting tower member 15.

Further, the upper flange 15b of the second stage connecting member 15 is mated with the lower flange 15c of the third stage connecting tower member 15 and the mating surface of both flanges is fastened by bolts and the like. Thus, the second stage connecting tower member 15 is connected with the third stage connecting tower member 15. Thus, the connecting work of respective tower members 12, 13 and 15 is performed on the ground efficiently and safely.

Figure 7B:
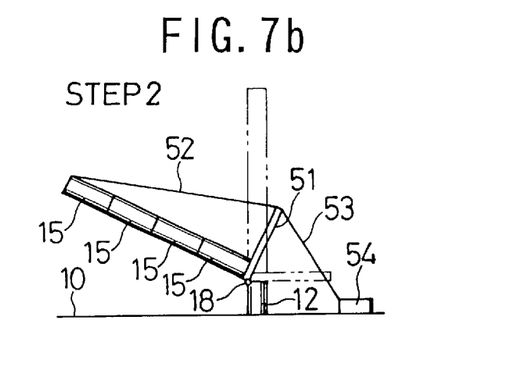

Next, at a step 2, as shown in FIG. 7b, a ginpole 51 is connected at the lower part thereof with the lower tower member 13 such that the ginpole 51 swings around the hinge 18. Then, the upper part of the highest stage connecting tower member 15 is connected with the upper end of the ginpole 51 through a tensile wire 52 and the upper end of the ginpole 51 is connected with the a winch 54 through a towing wire 53. Thus, when the towing wire 53 is wound up by the winch 54, the lower tower member 13 and a plurality of connecting tower members 15 which are integrally connected with each other rotates around the hinge 18, being raised from the falling position to the standing position as shown by two-dot chain lines in FIG. 7b.

Then, in this standing position, the upper flange 12b of the base tower member 12 is connected with the lower flange 13c of the lower tower member 13 by bolts and the like. Thus, the tower 11 constituted by the base tower member 12, the lower tower member 13 and a plurality of the connecting tower member 15, is formed. After that, the ginpole 51, the tensile wire 52, the towing wire 53 and the like are removed.

Since the respective flanges 12b, 13c, 13b, 15c and 15b are formed on an inner side of the tower members, the tower 11 has a smooth outer periphery surface 11a.

Further, the bearing 19 and the nacelle mounting plate 20 is installed on the upper flange 15b of the highest stage connecting tower member 15 in a falling state of the tower 11.

On the other hand, the nacelle equipment 30 to be mounted on the front nacelle section 21A side, namely, the rotation shaft 32, the hub 31a, the bearing box 33, the gear box 34, the brake 35 and the like, are mounted on the front supporting member 24 of the front nacelle section 21A. Similarly, the nacelle equipment 30 to be mounted on the rear nacelle section 21B side, namely, the generator 37, the controller 38, the hydraulic pressure source 39 and the like, are mounted on the rear supporting member 25 of the rear nacelle section 21B.

Further, at a step 3, as shown in FIG. 7c, a platform 55 is prepared in the neighborhood of the lower end of the tower 11. First, the front nacelle section 21A is placed on the front side of the tower 11 and the rear nacelle section 21B is placed on the rear side of the tower 11, as shown by broken lines of FIG. 7c. Next, both nacelle sections 21A, 21B are made closer and closer to each other with the base member 11 in between and are connected with each other through the nacelle connecting section 21c. The connected, integrated nacelle 21 is placed on the platform 55.

The guide mechanism 45 and the safety device 46 are mounted before or after the connection of the front nacelle section 21A and the rear nacelle section 21B. Further, blades 31b are attached to the hub 31a.

Figure 7D:
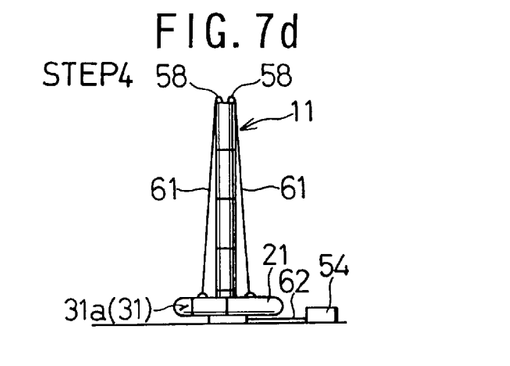
Figure 8:
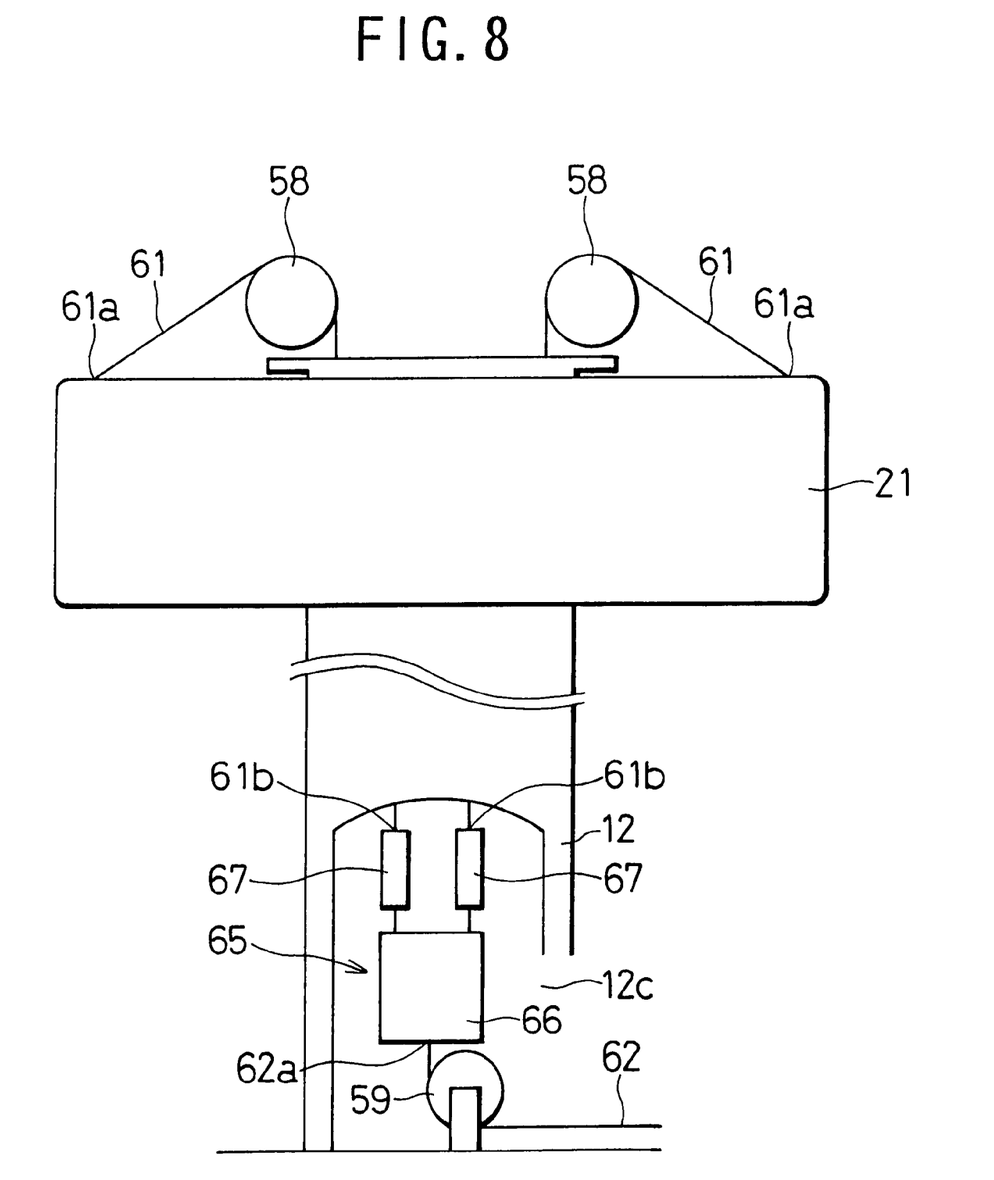
FIG. 8 is an explanatory view showing an outline of a lifting apparatus according to an embodiment of the present invention.
Figure 9:
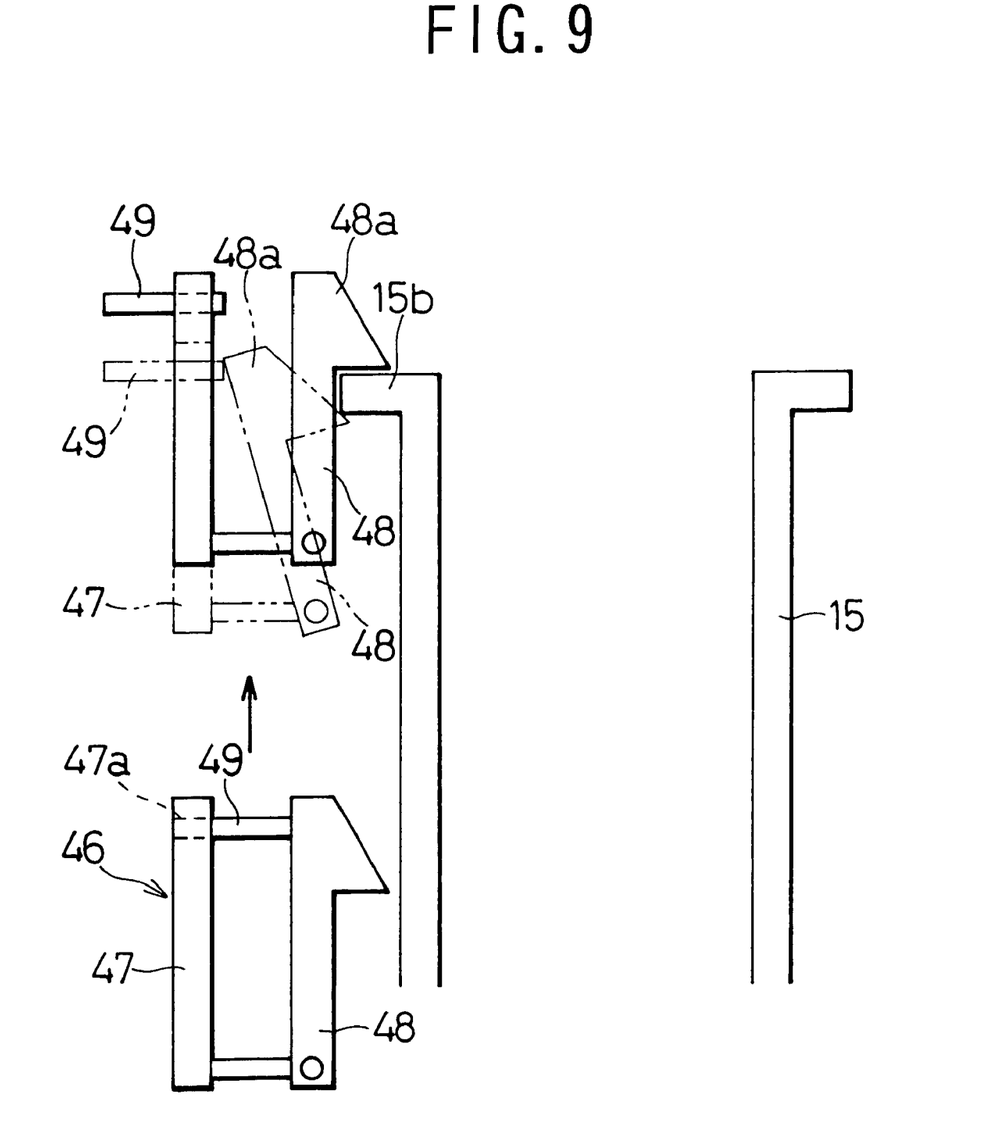
FIG. 9 is a sectional view showing a variation of a safety device according to an embodiment of the present invention.

At a step 4, as shown in FIG. 7d, a lifting apparatus is installed. The lifting apparatus, as shown in FIG. 5 and FIG.

8, comprises a plurality of pulleys 58 (in this embodiment, a pair of pulleys) provided at the upper end of the tower 11, a pulley 59 attached to the base 10 in the base tower member 12, the winch 54 disposed in the vicinity of the tower 11, two lifting wires 61 connecting the nacelle 21 and an adjuster 65 and a towing wire 62 connecting the adjuster 65 and the winch 54.

The two lifting wires 61, 61 are connected at respective ends 61a, 61a thereof with the front and rear ends of the nacelle 21, respectively. The respective wires 61, 61 are looped around the pulleys 58, 58 and connected at other ends 61b, 61b thereof with the adjuster 65. The towing wire 62 is connected at one end 62a thereof with the adjuster 65, looped around the pulley 59, led out of the tower 11 and connected at the other end thereof with the winch 54.

The adjuster 65 disposed between the lifting wire 61 and the towing wire 62 comprises a base 66 and a length adjusting mechanism, for example, a turnbuckle 67 for correcting the length of respective lifting wires 62, 62 so as to hold the nacelle 21 in a horizontal position.

Figure 7E:
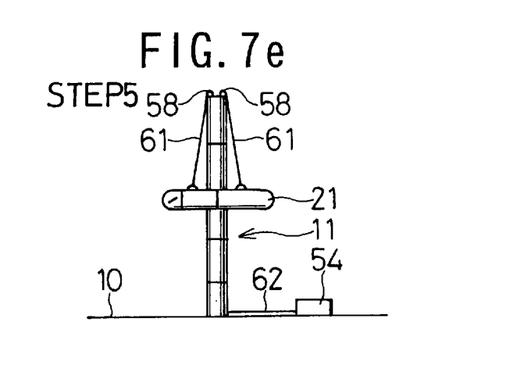

Next, at a step 5, as shown in FIG. 7e, the nacelle 21 is lifted up through the adjuster 65 along the tower 11 by the towing wire 62 wound up by the winch 54.

When the nacelle 21 is lifted up, the guide mechanism 45 provided in the nacelle 21 guides the nacelle 21. That is, the guide roller 45b of the guide mechanism 45 rolls on the outer periphery surface 11a of the tower 11 while it is pressed thereon. As a result, the nacelle 21 is raised smoothly along the outer periphery surface 11a of the rower 11 without swinging leftward and rightward.

Further, in case where the lifting wire 61 or the towing wire 62 is broken, the reverse rotation prevention mechanism of the respective guide rollers 45b operates to prevent the nacelle 21 from dropping.

Figure 7F:
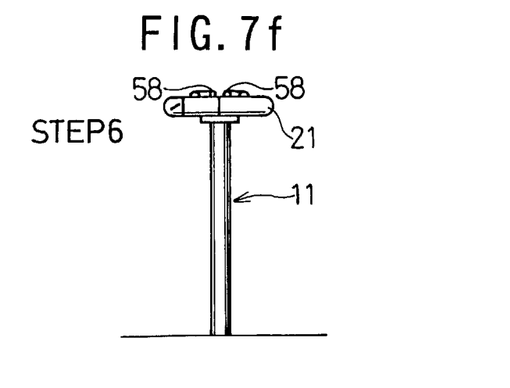

When the nacelle 21 further goes up and reaches a certain position near the upper end the tower 11, according to a step 6 as shown in FIG. 7f, the nacelle 21 is engaged with and fixed to the specified position of the tower 11 by the safety device 46. That is, as shown in FIG. 6, when the safety device 46 rises along the tower 11 together with the rising nacelle 21 while one end of the indicator rod 49 fitted to the trough hole 47a abuts against the hook member 48, the hook member 48 contacts the outer periphery edge of the nacelle mounting plate 20 and is pushed towards the supporting member 47 side. When the safety device 46 further goes up, the hook 48a of the hook member 48 is engaged with the upper surface of the nacelle mounting plate 20 to prevent the nacelle 21 from dropping. Further, at this moment, the indicator rod 49 projected from the through hole 47a indicates that the nacelle 21 rises up to the specified position and engaged therein.

Figure 7G:
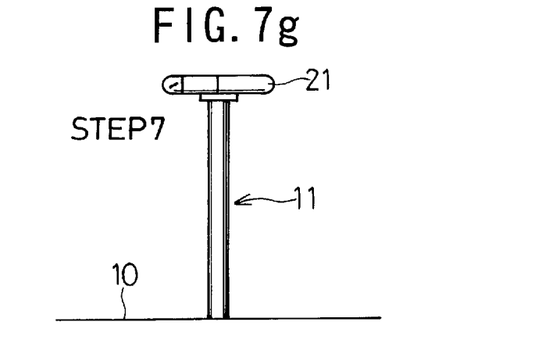

Next, at a step 7 of FIG. 7g, the nacelle mounting member 26 is secured to the nacelle mounting plate 20 by bolts and the like, as shown in FIG. 3, and then the pulleys 58, 59, the lifting wire 61 and other lifting apparatuses such as the adjuster 65, are removed from the tower 11 and the nacelle 21.

After that, the yaw motor is mounted on the nacelle mounting plate 20 and further the nacelle equipment 30, such as the actuator 36, the drive shaft 40 and the like, extending over both areas of the front nacelle section 21A and rear nacelle section 21B, are lifted along the interior of the tower 11. After all equipment is ready to be mounted in the nacelle 21, the tower penetrating hole 22 is closed by the lid 22a.

In summary, according to the embodiment described before, since the tower 11 is divided into several tower members each of which has a size not hindering transportation, such as the base tower member 11, the lower tower member 13 and a plurality of the connecting tower members 15, the construction of the tower 11 is available even in places or terrain under bad conditions such as islands, mountains, remote places and the like. Further, since the nacelle 21 can be lifted up along the tower 11 and mounted on the specified position of the tower 11 without using a large scale of construction machines like cranes, a large amount of the construction cost can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A horizontal axis type wind turbine having a tower mounted on a base, a nacelle mounted on said tower and a rotor supported by said nacelle, said tower comprising:
   a base tower member mounted on said base;
   a lower tower member hingedly connected at a lower end thereof with an upper end of said base tower member through a hinge so as to swing from a lying position to a standing position;
   a first stage connecting tower member connected at a lower end thereof with an upper end of said lower tower member; and
   a highest stage connecting tower member connected at a lower end thereof with an upper end of a second highest stage connecting member.

2. The wind turbine according to claim 1, wherein said nacelle has tower penetrating hole through which said tower vertically penetrates and is formed by a plurality of nacelle sections divisible around said tower penetrating hole.

3. A method of constructing a tower of a horizontal axis type wind turbine, said tower including a base, a base tower member, a lower tower member, a hinge for hingedly connecting said base tower member and said lower tower member and at least one connecting tower member, comprising the steps of:
   mounting said base tower member on said base;
   connecting said lower tower member with said base tower member through said hinge in a lying position of said lower tower member;
   connecting a first connecting tower member with said lower tower member in a lying position;
   connecting a higher connecting tower member with said first connecting tower member in a lying position;
   connecting a highest connecting tower member with said higher connecting tower member in a lying position; and
   swinging said lower tower member around said hinge together with said connecting tower members connected with each other and standing said lower tower member along with said connecting members on said base tower member in a standing position.

4. A method of lifting and mounting a nacelle of a horizontal axis type wind turbine on the top end of a tower thereof, said nacelle including a tower penetrating hole through which said tower vertically penetrates and is formed by a plurality of nacelle sections divisible around said tower penetrating hole, comprising the steps of:
   connecting a plurality of said nacelle sections and forming said nacelle while said nacelle is penetrated by said tower before lifting;

lifting said nacelle along said tower with a plurality of tensile members vertically going through the interior of said tower and a plurality of pulleys provided in said tower;

confirming whether or not said nacelle reaches a specified position of the top end of said tower; and connecting said nacelle with the top end of said tower.

5. A horizontal axis type wind turbine, comprising:

a base;

a tower mounted on said base;

a nacelle mounted on said tower and having a penetrating hole being penetrated by said tower so as to enable lifting up said nacelle along said tower;

a rotor supported by said nacelle; and a guide mechanism provided in said nacelle for assisting the lifting-up of said nacelle along said tower;

said guide mechanism including:
 a plurality of arms swingingly connected to said nacelle; and
 a guide roller rotatably connected to the tip of each of said arms, being biased on an outer peripheral surface of said tower.

6. A horizontal axis type wind turbine, comprising:

a base;

a tower mounted on said base;

a nacelle mounted on said tower and having a penetrating hole being penetrated by said tower so as to enable lifting up said nacelle along said tower; and a rotor supported by said nacelle;

said nacelle being formed by a plurality of nacelle sections divisible around said penetrating hole, said sections being connected with each other around said tower when mounting said nacelle on said tower.

7. A horizontal axis type wind turbine, comprising:

a base;

a tower mounted on said base;

a nacelle mounted on said tower and said nacelle having a penetrating hole being penetrated by said tower so as to enable lifting up said nacelle along said tower;

a rotor rotatably supported by said nacelle; and a safety device provided in said nacelle for preventing said nacelle from falling down from said tower by hooking said safety device on said tower.

8. The horizontal axis type wind turbine according to claim 7, wherein said safety device includes:

a supporting member supported by said nacelle, a hook member swingingly connected to said supporting member to be engaged with a projected portion of said tower.

9. The horizontal axis type wind turbine according to claim 8, wherein said safety device further includes:

an indicator rod slidably fitted to a through hole bored in said supporting member and abutting said hook member for informing whether said nacelle is reached at the top of said tower, wherein said indicator projects from said through hole by movement of said hook member when said hook member is pushed by said projected portion of said tower.

* * * * *